Oct. 9, 1928.

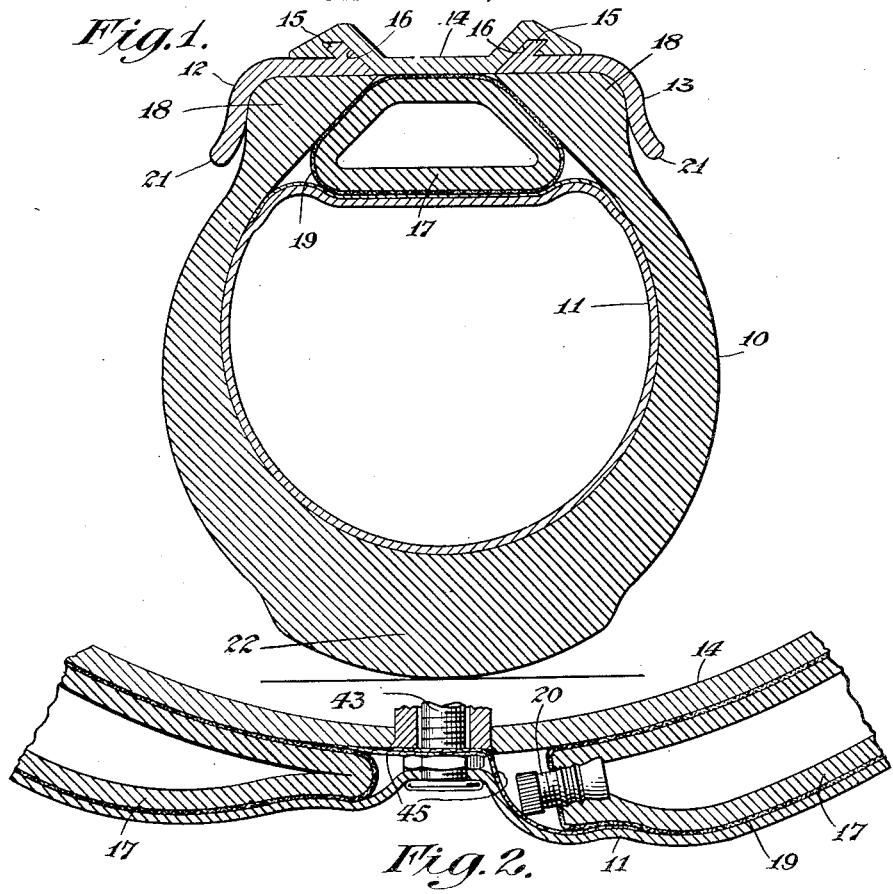
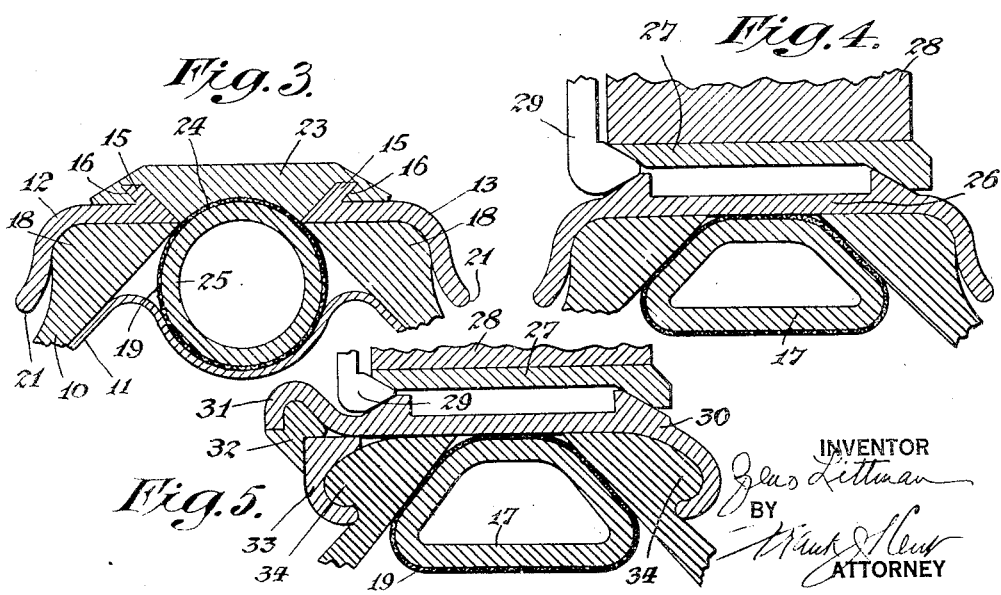

Z. LITTMAN

PNEUMATIC TIRE

Filed Dec. 20, 1924

1,686,977

INVENTOR
Zeus Littman
BY
ATTORNEY

Patented Oct. 9, 1928.

1,686,977

UNITED STATES PATENT OFFICE.

ZENO LITTMAN, OF NEW YORK, N. Y.

PNEUMATIC TIRE.

Application filed December 20, 1924. Serial No. 757,098.

This invention relates to means for protecting a vehicle wheel tire of the pneumatic type against injury when the vehicle is operated with the tire in a deflated condition.

The invention includes the use of a buffer or supplemental tire member interposed between the supporting rim and the inner tube of the tire and serving, under a deflated condition of the tire, to receive the weight of the vehicle and prevent the edges of the rim flanges from riding on and cutting the collapsed shoe. An additional function provided by the supplemental tire is the prevention of circumferential creeping of the deflated tube within the shoe, this function being effected by the pressure exerted by the supplemental tire member on the deflated main tube.

In what may be referred to as a preferred form of the invention, the supplemental tire member takes the form of a pneumatic tube adapted to be placed in position within the tire proper and between the supporting rim and the inner tube. The supplemental tire structure is adapted to be used with special or with standard forms of rim constructions.

The invention comprehends also the use of modified forms of supplemental tire construction including the use of metal, wood, solid rubber and the like, in hollow or solid form.

Other features of the invention will be hereinafter referred to.

In the drawings, in which a number of embodiments of the invention are disclosed, Figure 1 is a view in cross-section of a pneumatic tire and supporting rim therefor equipped with a supplemental tire or buffer embodying the invention.

Figure 2 is a view in longitudinal section and showing a detail of the construction of the embodiment of the invention shown in Figure 1.

Figure 3 is a view similar to Figure 1 showing a modified form of supporting rim as well as a modified form of supplemental tire.

Figure 4 is a view similar to Figure 1 showing the supplemental tire construction used in conjunction with a tire supporting rim of the ordinary straight-side type.

Figure 5 is a view similar to Figure 4 showing the supplemental rim used in connection with a supporting rim structure of the clincher type.

Figure 6:
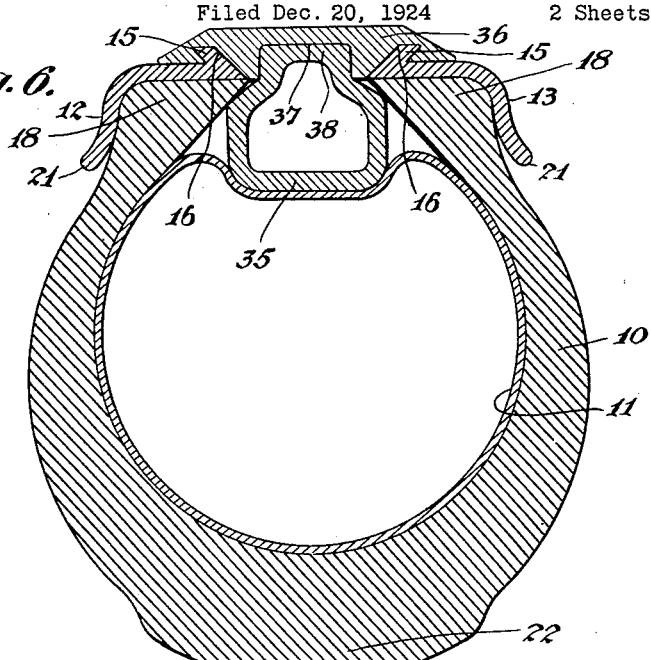
Figure 6 is a view similar to Figure 3 showing a modified form of supplemental tire.

Referring to the drawings for a more detailed description of the invention, in Figure 1 there is shown in cross-section an automobile tire including the usual shoe 10 and inner tube 11, the tire parts being mounted on a rim supporting construction similar to that shown in my copending application Serial No. 757,097, filed December 20, 1924, which has matured into patent No. 1,593,877, July 27, 1926, in which tire supporting flange members 12 and 13 are locked in their supporting position by means of a centrally disposed locking ring section 14. Locking engagement of the locking ring section 14 and the flange members 12 and 13 is brought about through the interengagement of tongues 15 carried by the flanges and complementary grooves 16 formed in the wing members of the locking section 14.

The invention hereinafter described has for its principal purpose the prevention of injury to the tire which is ordinarily produced following a puncture and the operation of the vehicle when the tire is in a deflated condition. In order to accomplish this important purpose, a supplemental pneumatic tire member 17 is so formed as to be placed in position between the edge portions 18 of the shoe 10 and resting against the outer surface of the mid-section 14 of the tire rim supporting section already referred to. The supplemental tire member 17 is formed with substantially thicker walls than those of the tube 11 and preferably the supplemental tire is reinforced by an outer wrapping of canvas 19. The supplemental tire is of the pneumatic type and may be inflated by means of an inflation valve 20 formed in one end thereof as is clearly shown in Figure 2 of the drawing. In order to prevent longitudinal creeping or shifting of the supplemental tire structure 17 in its seat, tab members 45 formed on the ends of the supplemental tire structure are placed in overlapping engagement with each other and are provided with perforations through which the valve stem structure passes to thereby provide the anchoring function desired.

In operation the inflated supplemental tire 17 occupies a position between the tire rim supporting member and the inner tube 11 of the tire so that if a deflation of the main tire takes place by reason of a puncture or blow-out, the presence of the inflated supplemental tire 17 prevents the destructive cutting or pinching of the tire structure between the edges 21 of the rim flanges and the ground. A reference to Figure 7 of the drawings will show, in a general way, how this is accomplished. The outer peripheral surface of the supplemental tire projects radially beyond the edges 21 of the rim flanges so that the tread portion 22 of the shoe 10 is prevented from entering into the space between the rim flanges so that there can be no pinching or cutting of the engaged portions of the shoe between the flange edges 21 and the ground.

In Figure 3 of the drawing there is shown a modified form of the invention wherein the rim structure and the supplemental tire are differently formed. The midsection 23 of the rim structure is formed with a circular seat 24 in its outer peripheral face in which is received the cylindrical, supplemental tire member 25. The tire member 25 may be wrapped with canvas 19 in this form of the invention in a manner similar to that shown in Figure 1.

In Figure 4 of the drawings there is shown another form of the invention in which the rim structure follows a well known type for use in connection with straight-side tires. In this form of the invention the rim member 26 may be held in position on the metal band 27 carried by the wheel felloe 28 through the use of any suitable clamping and wedging device 29. The rim member 26 of this well known type is also well adapted to support a supplemental tire structure 17 such as has been described in connection with Figure 1 of the drawings.

In Figure 5 of the drawings a construction similar to that shown in Figure 4 is disclosed in which, however, tires of the clincher rather than the straight-side type are provided for. The rim member 30 of the construction shown in Figure 5 includes a seat 31 for receiving a locking member 32 to hold a removable flange member 33 in place to thereby clinch or lock the clincher edges 34 of this type of shoe in place. It will be seen that the supplemental rim member 17 is adapted for use with this form of tire supporting rim as well as that shown in Figures 1 and 4 of the drawings.

In Figure 6 of the drawings a rim structure similar to that shown in Figure 3 is shown but the supplemental tire member or buffer 35 in this case is formed of metal instead of rubber or other inflatable material. Preferably the metal, supplemental tire member 35 is hollow in section as shown in order to obviate the unnecessary weight of a solid metal structure. The locking section 36 of the supporting rim is preferably formed with a rectangular seat 37 to receive a correspondingly formed base 38 formed in the supplemental tire structure 35.

Figure 7:
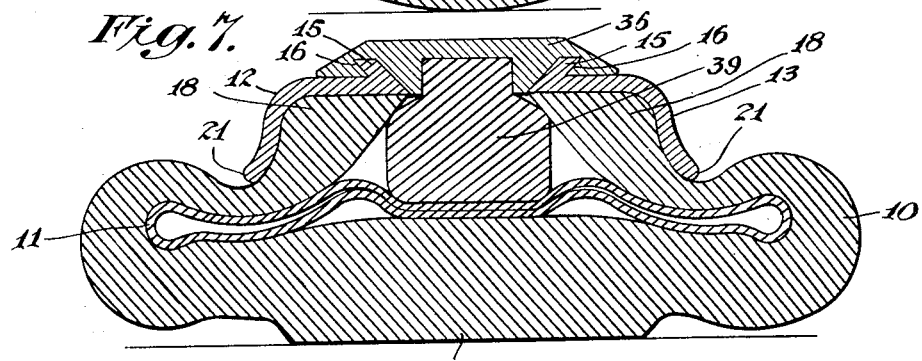
Figure 7 is a view in cross-section showing a modified form of supplemental tire and the position of the parts when the main tire is in a collapsed condition.
Figure 8:
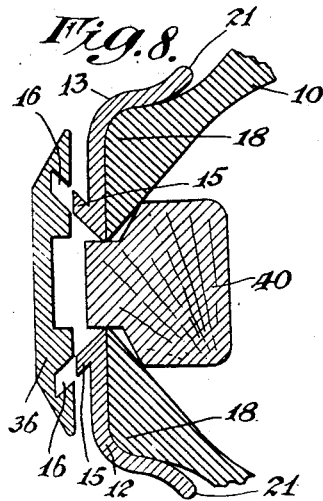
Figure 8 is a view in cross-section showing parts similar to those shown in Figure 7 in a demounted or separated condition.

In Figure 7 of the drawings there is shown a construction similar to that shown in Figure 6 except that the supplemental tire member 39 is formed of solid rubber or like material. A supplemental tire structure 40 identical with that shown in Figure 7 is shown in Figure 8 of the drawings, the supplemental tire structure in Figure 8 being formed of wood instead of rubber. In Figure 8 is shown the relation of the parts of the construction shown in Figure 7 when the parts are in dismounted or disassembled relation.

Figure 9:
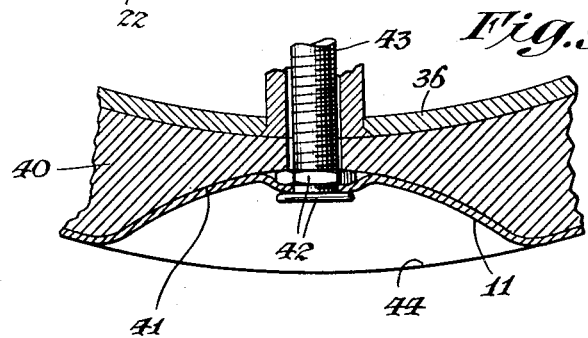
Figure 9 is a longitudinal section of the type of construction shown in Figures 7 and 8 in the region of the air valve.

In Figure 9 of the drawings is shown a hollowed-out formation 41 of the supplemental tire structures shown in Figures 6, 7 and 8. In order to accommodate the tube engaging parts 42 of the valve stem structure 43 and to prevent injury to the tire by these parts when the tire is operated in a flat condition, it will be seen that the valve stem parts are held in an out-of-the-way position in the depression 41 well beneath the lines 44 defining the outer peripheral surface of the supplemental tire member.

The various forms of the invention described will severally function to prevent the objectionable rim-cutting action that so frequently occurs when tires of the ordinary construction are operated in a flat or deflated condition. In addition to the prevention of injury to the tires by the rim flanges under the circumstances referred to, the effective prevention of longitudinal creeping of the tire along the supporting rim and thereby obviating tearing of the valve stems from their engagement with the tubes, is also obtained. This useful function results from the relatively great clamping pressure which is brought about by the weight of the vehicle exerted through the buffer or supplemental tire member which serves to clamp the interposed portion of the tread section 22 of the shoe 10 between the outer periphery of the supplemental tire structure and the ground. This clamping action effectively prevents the creeping of the tire structure with relation to its supporting rim and thereby overcomes the objectionable feature referred to as accompanying the operation of tire constructions of types heretofore known and used.

An important result of the construction is that when the main tube is collapsed the steering qualities are nevertheless unimpaired, because the tread is of substantially the same width as it is in the normal tire.

What I claim is:—

In a device as specified, the combination of a tire supporting rim having rim flanges thereon, a pneumatic tire shoe supported on said rim, a pneumatic tube within said shoe, a valve for said tube, and a supplemental tire mounted on the tire supporting rim to project beyond the peripheries of the rim flanges to thereby protect the pneumatic tube and shoe from injury, when collapsed, by the rim, said supplemental tire having terminal portions arranged to lie in close adjacency to opposite sides of the valve for the pneumatic tube, one of said terminal portions being provided with an inflation valve, and means connected to the terminal portion carrying the inflation valve and extending transversely across the end of the inflation valve for preventing contact of said valve with the pneumatic tube.

In testimony whereof I affix my signature.

ZENO LITTMAN.